United States Patent
Burrows

(10) Patent No.: US 9,016,624 B2
(45) Date of Patent: *Apr. 28, 2015

(54) AIRCRAFT CABIN BIN RETROFIT

(71) Applicant: Heath Tecna Inc, Bellingham, WA (US)

(72) Inventor: Ralph Martin Burrows, Bellingham, WA (US)

(73) Assignee: Health Tecna Inc., Bellingham, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/189,872

(22) Filed: Feb. 25, 2014

(65) Prior Publication Data
US 2014/0183302 A1  Jul. 3, 2014

Related U.S. Application Data

(63) Continuation of application No. 13/414,498, filed on Mar. 7, 2012, now Pat. No. 8,657,231.

(51) Int. Cl.
*B64D 11/00* (2006.01)
(52) U.S. Cl.
CPC .................... *B64D 11/003* (2013.01)
(58) Field of Classification Search
CPC ............... B64D 11/00; B64D 11/003; B64D 2011/0046
USPC ......... 244/118.1, 118.2, 118.5; 312/245, 246; 296/37.8, 24.4, 24.44–24.45
See application file for complete search history.

(56) References Cited

U.S. PATENT DOCUMENTS

| 5,549,258 | A | 8/1996 | Hart et al. |
| 7,090,314 | B2 | 8/2006 | Burrows et al. |
| 7,887,008 | B2 | 2/2011 | Lamoree et al. |
| 2003/0080247 | A1 | 5/2003 | Frazier |
| 2011/0253837 | A1 | 10/2011 | Lee et al. |

FOREIGN PATENT DOCUMENTS

| FR | 2909941 | 6/2008 |
| RU | 2300485 | 6/2007 |

*Primary Examiner* — Tien Dinh
*Assistant Examiner* — Richard R Green
(74) *Attorney, Agent, or Firm* — Dwayne E. Rogge; Schacht Law Office, Inc.

(57) ABSTRACT

Disclosed herein is an asymmetric luggage stowage bin arrangement, with a pair of compartments attached to a single bin housing. The compartments being unequal in length, to optimize the storage capacity of the bin housing relative to the most common luggage dimensions on the market. In one form, the asymmetric luggage stowage bin arrangement is used as a retrofit to replace shelf-style luggage stowage compartments common to older style aircraft.

5 Claims, 5 Drawing Sheets

AIRCRAFT CABIN BIN RETROFIT

RELATED APPLICATIONS

This application claims priority benefit of and is a continuation of U.S. Ser. No. 13/414,498 now U.S. Pat. No. 8,657,231, filed Feb. 25, 2014, incorporated herein by reference.

BACKGROUND OF THE DISCLOSURE a) Field of the Disclosure

This disclosure relates to the field of commercial aircraft luggage bins.

SUMMARY OF THE DISCLOSURE

Disclosed herein is a luggage storage system for commercial aircraft. The system in one form comprising: a bin housing, a first luggage bucket, and a second luggage bucket. The bin housing in turn comprising: an aircraft frame attachment device, a first bin end-wall on one longitudinal of the bin housing, a second end-wall on the longitudinally opposite end of the bin housing from the first bin end-wall, a end-wall pivot on facing sides of the first and the second end-wall, a bin divider substantially parallel to each end-wall, wherein the distance between the first bin end-wall and the bin divider is substantially less than the distance between the second bin end-wall and the bin divider, and a divider pivot on both longitudinal sides of the bin divider.

The first luggage bucket in one form extending from the first bin end-wall to the bin divider the second luggage bucket attached to corresponding end-wall pivot and corresponding divider pivot.

The second luggage bucket extending from the second bin end-wall to the bin divider, the second luggage bucket attached to corresponding end-wall pivot and corresponding divider pivot.

The luggage storage system described above may be arranged wherein: the width of the first luggage bucket is between 35% to 45% of the width of the bin housing; and the second luggage bucket is between 55% to 65% of the width of the bin housing.

The luggage storage system as described above may be arranged wherein the width of the first luggage bucket is substantially 41% of the width of the bin housing; and the second luggage bucket is substantially 69% of the width of the bin housing.

The luggage storage system as described above may be arranged wherein: the first luggage bucket comprises a first luggage bucket face which longitudinally overlies the first bin end-wall and a portion of the bin divider less than half the longitudinal thickness of the bin divider; and the second luggage bucket comprises a first luggage bucket face which longitudinally overlies the first bin end-wall and a portion of the bin divider less than half the longitudinal thickness of the bin divider.

The luggage storage system described herein may be utilized as an aircraft luggage bin retrofit of an existing bin housing produced by the process comprising the steps of: removing the existing bin housing from the aircraft; and installing a retrofit bin housing with a plurality of asymmetric buckets. In one form the retrofit bin housing has substantially the same longitudinal dimension as the existing bin housing. The retrofit bin housing in one form comprises: an aircraft frame attachment device, a first bin end-wall on one longitudinal of the retrofit bin housing, a second end-wall on the longitudinally opposite end of the retrofit bin housing from the first bin end-wall, an end-wall pivot on facing sides of the first and the second end-wall, a bin divider substantially parallel to each end-wall, wherein the distance between the first bin end-wall and the bin divider is substantially less than the distance between the second bin end-wall and the bin divider, and a divider pivot on both longitudinal sides of the bin divider.

The retrofit process in one form further comprising the step of providing a first luggage bucket extending from the first bin end-wall to the bin divider the second luggage bucket attached to corresponding end-wall pivot and corresponding divider pivot.

The retrofit process in one form further comprising the steps of: providing a second luggage bucket extending from the second bin end-wall to the bin divider, the second luggage bucket attached to corresponding end-wall pivot and corresponding divider pivot; and installing the retrofit bin housing in place of the existing bin housing.

DESCRIPTION OF THE PREFERRED EMBODIMENTS

As new types of aircraft are introduced, and current aircraft models have their Original Equipment Manufacturer (OEM) interiors upgraded, existing aircraft with aging interiors often fall short of satisfying passenger expectations by comparison. Passengers who fly often prefer interiors with pivot buckets, such as those found on newer airliners, but these bucket systems are usually expensive to retrofit into older aircraft with stock OEM shelf bins. To solve this retrofit problem, an asymmetric PBI (Pivot Bin Interior) is disclosed herein with a unique configuration that fits in standard modules (such as for example 80" modules) without significant modification to the aircraft. This arrangement results in the asymmetric PBI being a cost effective retrofit option. In one form, the asymmetric PBI's may be configured with a deep pivot bucket design. Passengers can stow for example up to seven standard carry-on roller bags transversely on their sides, in two buckets, per 80" module. This improved storage arrangement is beneficial to airlines who want to significantly increase baggage capacity in the cabin, and especially so for airlines who want to offer an improved overhead stowage system across their fleet. In one form, asymmetric PBI's may be complemented by an interior upgrade system that may for example include electronic bucket latching and bucket assist systems, half-oval lowered ceilings, modern styled Passenger Service Units (PSUs), sculpted sidewalls with wider looking reveals, and a Light Emitting Diode (LED) mood lighting system that provides a continuous wash of light along the cabin.

Figure 5:
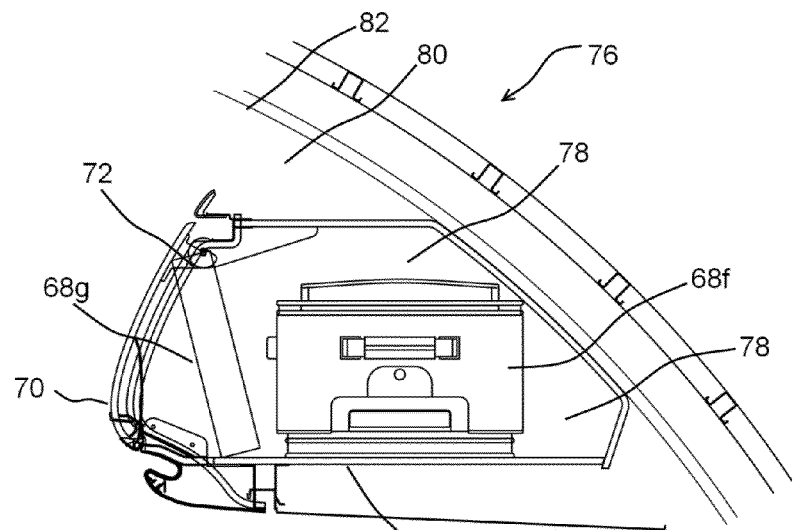
FIG. 5 is a cutaway/hidden line side view of a prior art aircraft luggage bin.

With a stationary shelf system, such as that shown in FIG. 5, the luggage is not repositioned once in place in the storage compartment. To gain access to the luggage compartment, the face 70 is opened about a pivot 72. Thus the weight of the luggage and other stowed elements is not significant to operation of the stowage bin. Very wide modules may be, and have traditionally been utilized. In a drop or pivot bucket style module such as that shown in FIG. 6, the weight of the luggage and other stowed components is often consequential and wide buckets are often unwieldy to operate. Using the chart below, if five 40# luggage items were present in a single bucket, the total weight of the luggage alone could total up to 200#, which would be difficult for a normal person to lift and close.

One retrofit option is to divide a module into two equally sized bins. For example, an 80" shelf module may be replaced with two buckets having a width of about 40" each. While this results in a longitudinally symmetric arrangement, which is aesthetically pleasing, relatively inexpensive to produce and maintain, there are detriments to a symmetric arrangement.

Figure 6:
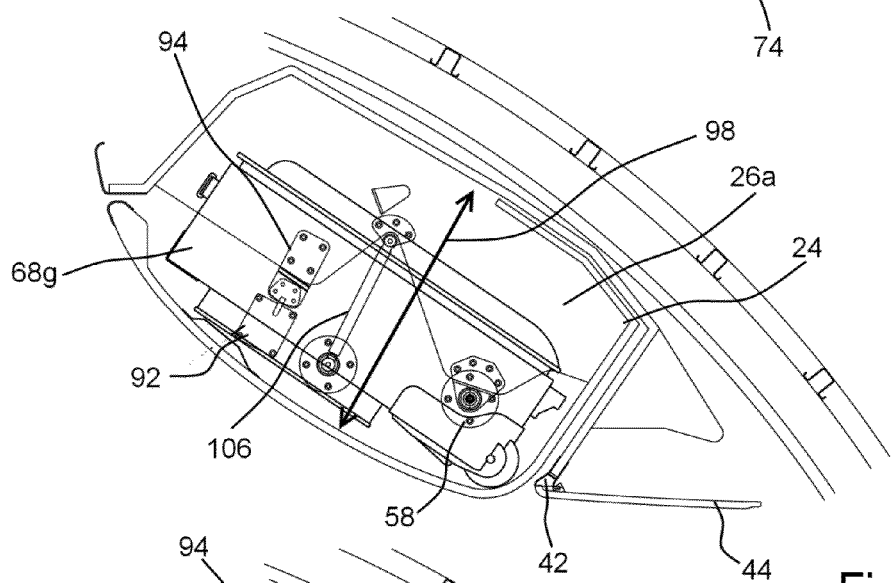
FIG. 6 is a cutaway/hidden line side view of an aircraft bin housing and a plurality of buckets according to one embodiment of the invention where the luggage is stowed on it's back.

One detriment to such an arrangement is that symmetric width options may not be an efficient use of the space. As luggage is generally produced to fit all airline requirements, most carry-on luggage is produced to fit within a 22"×14"×9" space. As shelf style modules often do not allow for luggage to be inserted with the narrowest side down, the luggage 68f must be placed on it's "back" as shown in FIG. 5. Using the general dimensions of 22"×14"×9", the 14" by 22" surface (back) would rest upon the shelf. Looking to the luggage item 68b of FIG. 1, the dimensions correspond respectively to a length 102, width 100, and height 104. Thus only two luggage items 68g as shown in FIG. 6 could be stowed in each narrow bucket, taking up about 28" of space, leaving about 12" of space unutilized per bucket. The result being four luggage items stowed per module. If the module however was adjusted to a 47"/33" arrangement, two luggage items could be stowed in the narrow (33") bucket, and three luggage items can be stowed in the wide (47") bucket.

Figure 7:
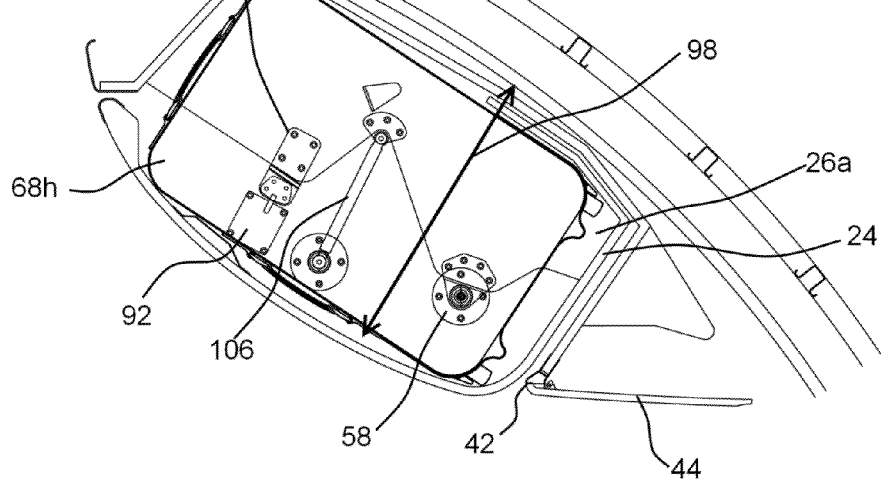
FIG. 7 is a cutaway/hidden line side view of an aircraft bin housing and a plurality of buckets according to one embodiment of the invention where the luggage is stowed on it's side.

Another advantage of a bucket retrofit can be achieved when the bucket is configured to allow luggage to be placed with the 9"×22" surface (side) placed upon the luggage supporting surface. Generally, this will require that the bucket have an effective height clearance 98 in excess of the width 100 of the luggage item. This arrangement can be achieved as shown in FIG. 5. Using the previous example, in a 33" bucket, three luggage items may be placed in the bucket on their sides, taking up 27" in the longitudinal direction when 9" luggage is used. In a 47" bucket, five luggage items can be stowed on their sides as shown by the luggage 68g of FIG. 7, taking up 45" in the longitudinal direction when 9" luggage is used. This combination allows eight luggage items to be stowed in an 80" asymmetric PBI module, where the shelf arrangement or a symmetric PBI of the same longitudinal space only allowed five items of luggage to be stowed in an 80" module.

Several Features which may be utilized with the disclosed asymmetric PBI installation include:

Bin capacity for roller bags will increase. In one embodiment by up to 86 bags per aircraft. (based on a target customer's Layout of Passenger Accommodations (LOPA))

Figure 1:
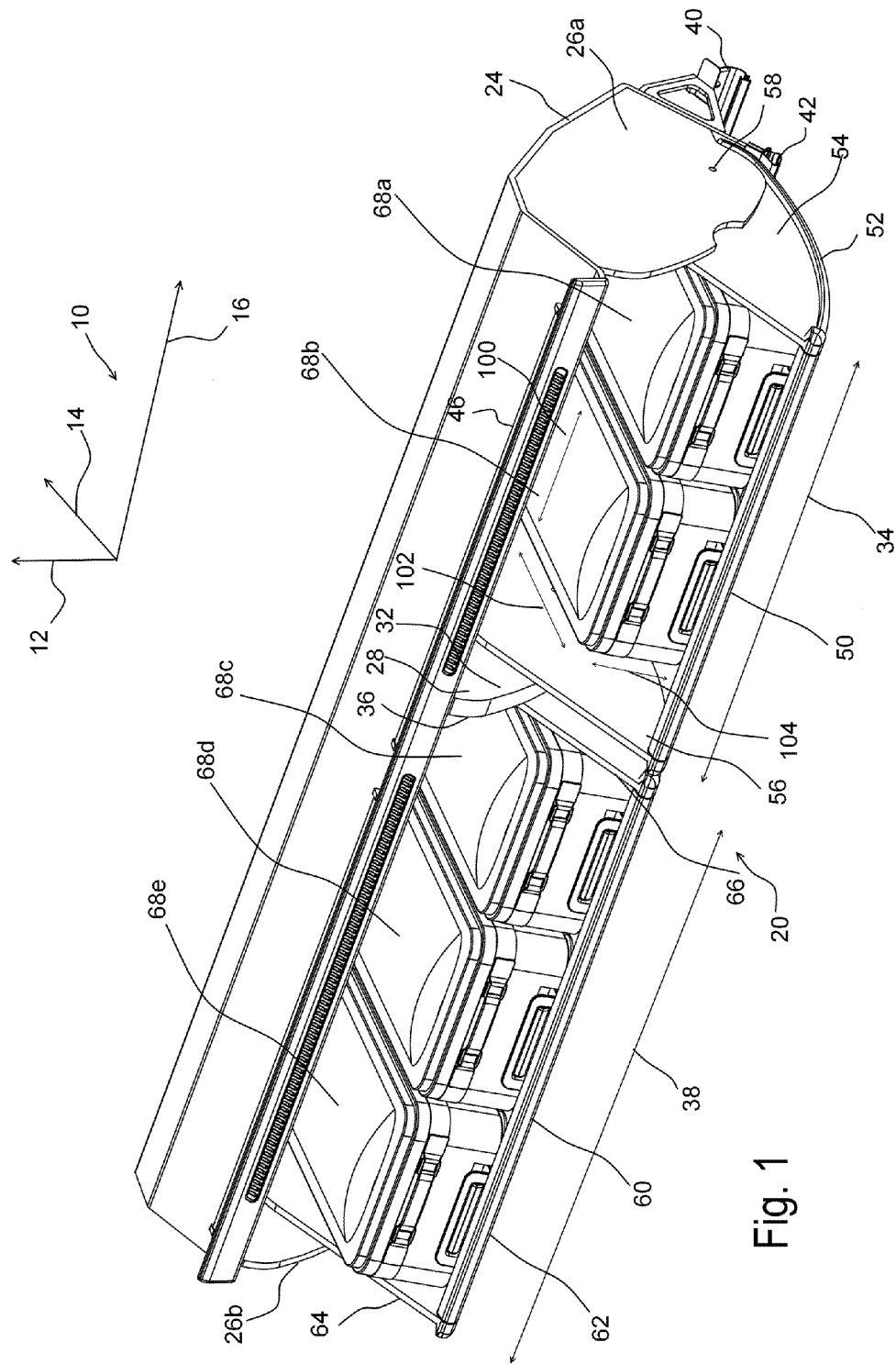
FIG. 1 is an isometric front view of an aircraft bin housing and a plurality of buckets according to one embodiment of the invention.

New lowered ceilings, pivot bins, PSUs, sidewalls, and LED lighting will give the cabin a contemporary appearance The spacious interior provides easier access to seats Bin loading/unloading is improved due to no internal hinges Electronic bin systems improve safety and reduce work LED fixtures offer efficiency and mood lighting effects New PSUs offer a better control layout for passengers Before beginning a detailed description of specific components, an axes system 10 is disclosed in FIG. 1. The axes system includes a vertical axis 12, a transverse axis 14, and a longitudinal axis 16. When the module 20 is installed into an aircraft 22, the longitudinal axis 16 is generally aligned with the long axis of the aircraft body while the aircraft is in a normal, parked position. The vertical axis 12 is vertical relative to Earth, and the transverse axis is orthogonal to both. The axes are intended to aid in describing the arrangement of components relative to each other, and are not intended to limit the claims to a specific orientation.

A numbering system will be utilized where each component has a numeric identifier, and various embodiments of that component include a alphabetic identifier. For example, the bin end-walls are identified with the numeral 26, and the first end-wall 26a includes the alphabetic identifier "a".

FIG. 1 shows one embodiment of a module 20 of an asymmetric PBI. The module 20 generally comprised of an asymmetric bin housing 24 having a plurality of bin end-walls 26a and 26b. A bin divider 28 is also shown longitudinally between the end-walls 26. The module 20 has a longitudinal length 30 and the distance between the inner surface of the first end-wall 26a and the facing surface 32 of the bin divider 28 defines a narrow bucket width 34. Similarly, the distance between the inner surface of the second end-wall 26b and the facing surface 36 of the bin divider 28 defines a wide bucket width 38. In equivalent embodiments, the bin divider may be positioned on either the right side or the left side of the longitudinal median of the bin housing 24.

The asymmetric PBI bin housing 24 in one form further comprises an aircraft frame attachment components 40 for attachment to the aircraft frame. In addition the bin housing includes a PSU attachment location 42 for connection to the PSU panels 44 as shown in FIG. 6. In addition, the bin housing 24 may comprise a ceiling panel attachment location 46 for connection to an aircraft ceiling panel 48. To improve esthetics and safety, the connection to the frame should be structurally secure, and may allow for adjustability to properly align the bin housing 24 to the PSU panels 44 as well as the ceiling panel 48.

A narrow bucket 50 is installed in a first region bounded by the first bin end-wall 26a and the bin divider 28. The narrow bucket 50 comprises a bucket face panel 52, a first bucket end-wall 54 adjacent to and pivot-ably connected to the first bin end-wall 26a, and a second bucket end-wall 56 adjacent to and pivotably connected to the bin divider 28. While a pivot location 58 is shown symbolically in FIG. 1, more detailed views are shown and described below.

A wide bucket 60 is installed in a second region bounded by the second bin end-wall 26b and the bin divider 28. The wide bucket 60 comprises a bucket face panel 62, a first bucket end-wall 64 adjacent to and pivot-ably connected to the second bin end-wall 26b, and a second bucket end-wall 66 adjacent to and pivot-ably connected to the bin divider 28.

As can be clearly seen in FIG. 1, luggage 68 is held in the buckets 50/60 as the buckets are in a lowered or open position. Due to the position of the pivot 58 near the back of the buckets relative to the face panels 52/62, the luggage is lowered as the buckets are opened. This enhances ability of the passengers of the aircraft to place, access, and remove their luggage relative to shelf-type bins such as that shown in FIG. 5 where the face 70 of the luggage storage compartment 76 pivots at a pivot point 72 near the vertical top edge of the face 70. In a shelf-type storage compartment 76, the luggage 68f rests upon a static shelf 74. Thus the shelf 74 must generally be horizontal so that the luggage 68f does not shift to result in loose luggage 68e which may not be secured during flight within the compartment 76. Often such shelf-type storage bins result in wasted space 78 above and behind the luggage 68f, as well as wasted space 80 between the compartment 76 and the aircraft frame 82 or inner skin thereof.

Figure 2:
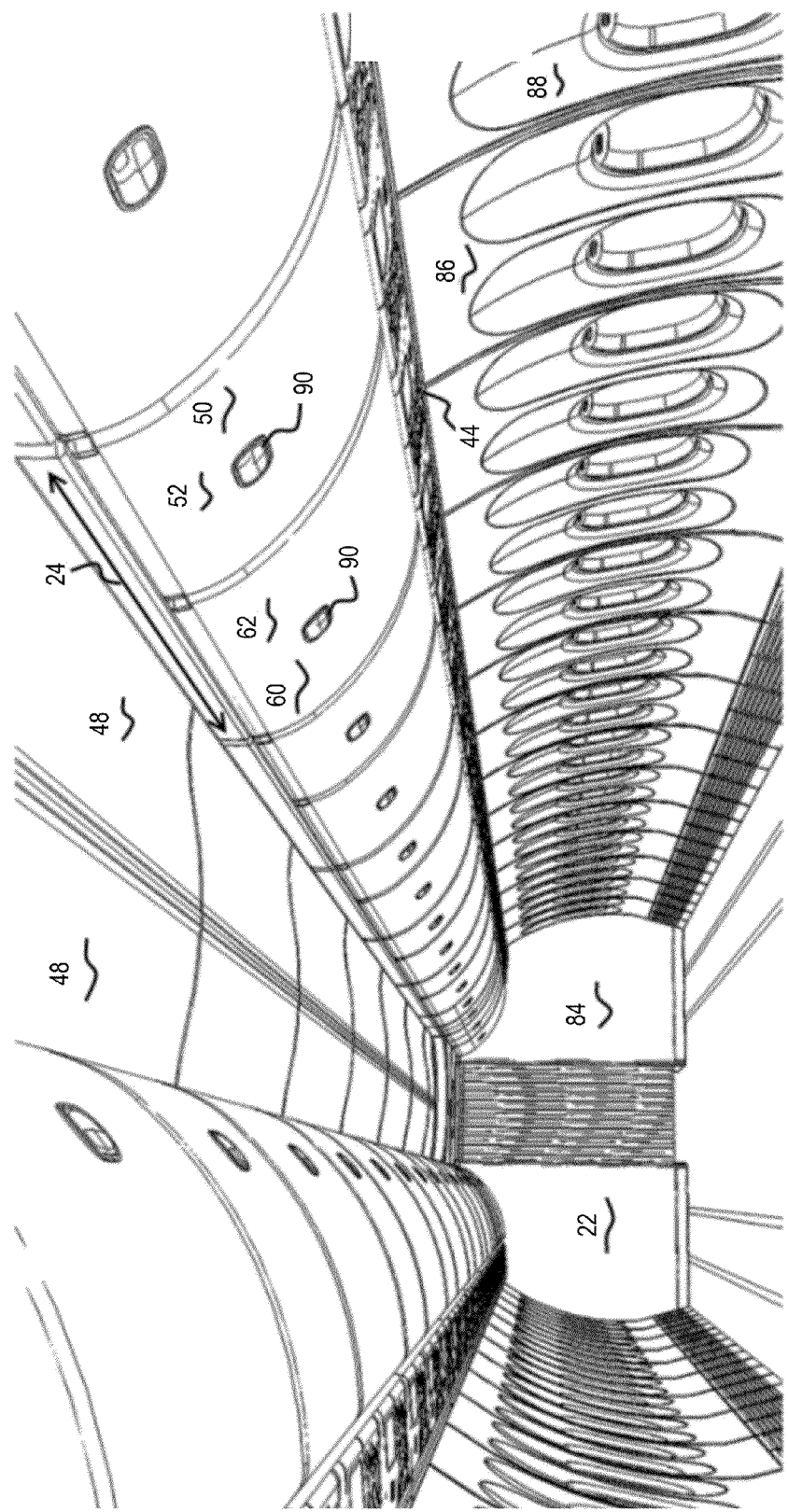
FIG. 2 shows an aircraft interior with a plurality of the bin housings of FIG. 1
Figure 3:
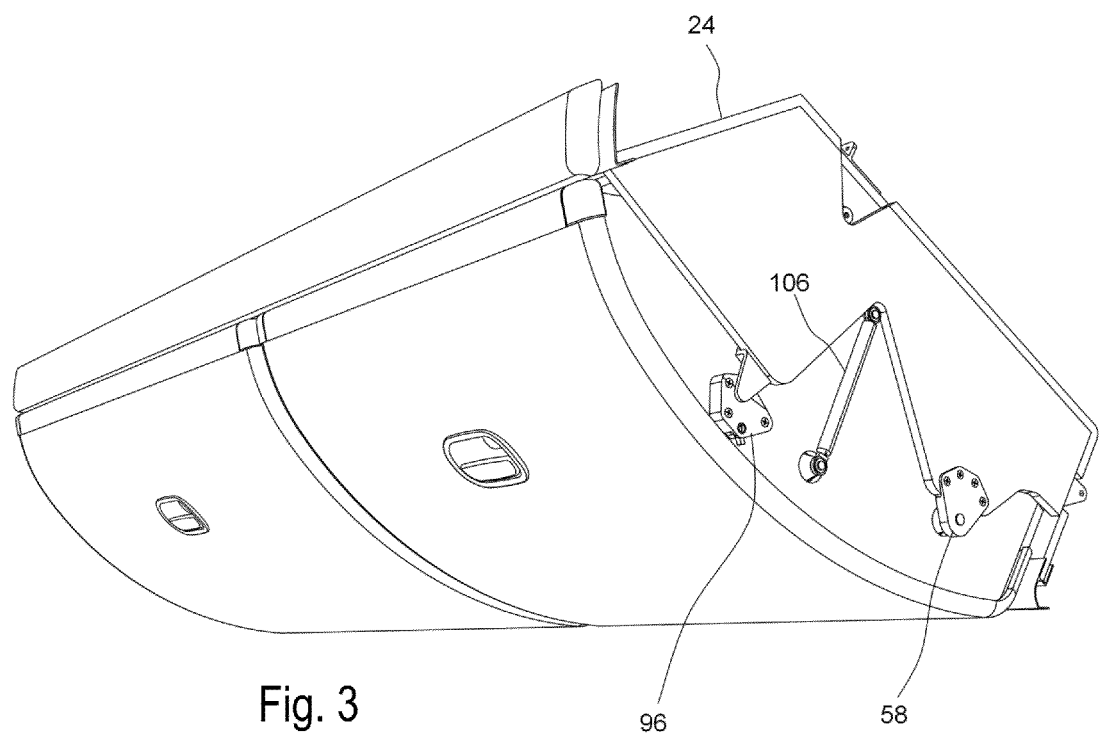
FIG. 3 is an isometric front view of an aircraft bin housing and a plurality of buckets according to one embodiment of the invention.
Figure 4:
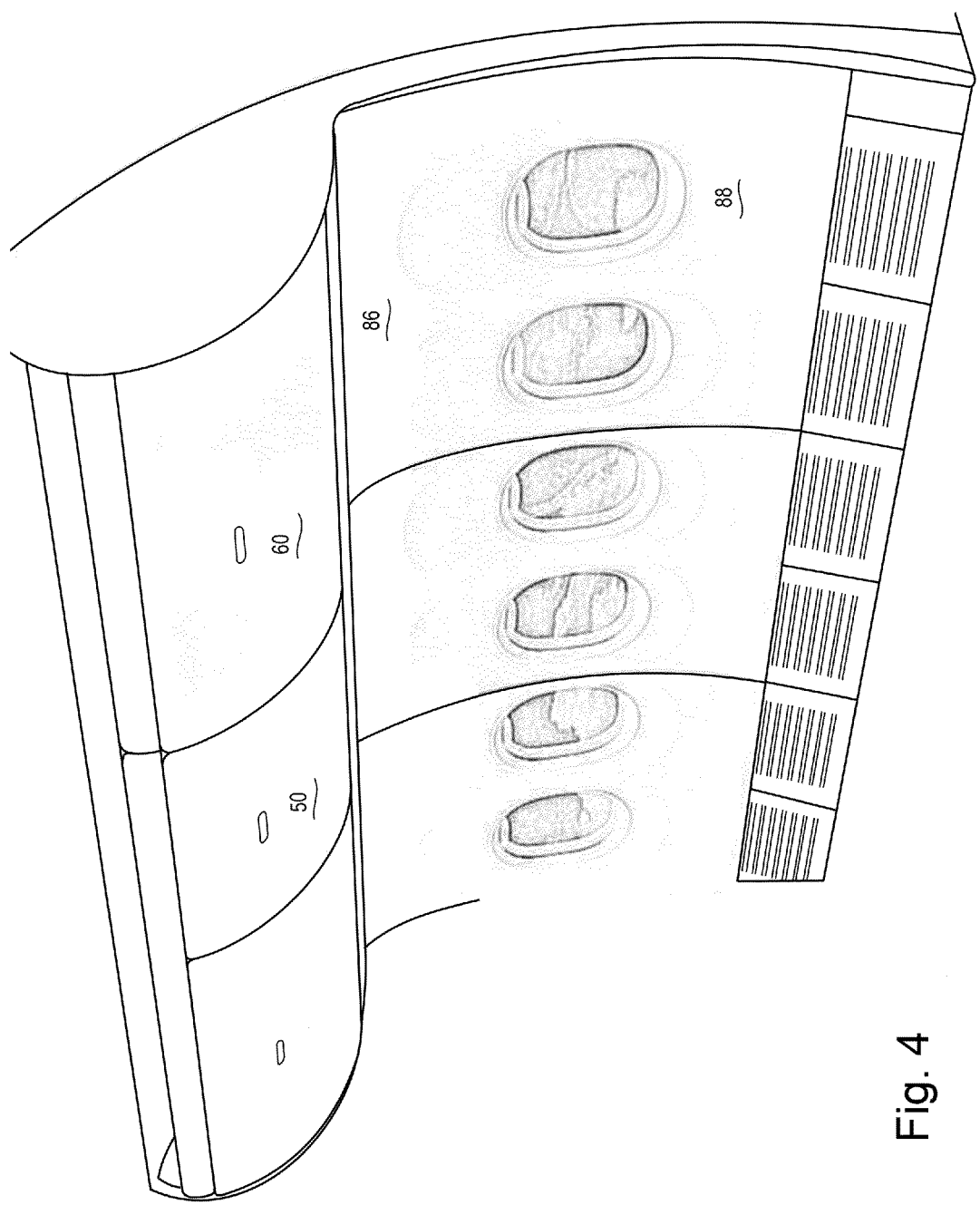
FIG. 4 is an aircraft bin housing and a plurality of buckets according to one embodiment of the invention.

Looking to FIG. 2, it can be seen how each module 20 may fit adjacent a similar module to produce a clean and pleasing arrangement to the interior 84 of the aircraft. While the asymmetric PBI does not produce the evenly spaced arrangement of prior art symmetric storage compartments, the increased luggage capacity makes the asymmetric PBI very beneficial in many applications. As previously described, each module 20 comprises a narrow bucket 50 and a wide bucket 60 installed in one bin housing 24. By arranging modules of similar configuration longitudinally adjacent each other wide-narrow (w-n) w-n w-n or possibly w-n n-w w-n etc. an overall longitudinally pleasing pattern can easily be achieved, even though each module is not in and of itself longitudinally symmetric. In addition, it will often be desired to have the transversely facing modules be mirror images of each other to enhance the aesthetic appeal of the overall interior.

Also shown in FIG. 2 are latch release handles 90 which can be operated by a passenger or crew to open each individual bucket. The latch release handles 90 in one form are connected to latch mechanisms 96 which selectively prohibit opening of the buckets. FIG. 6 will be used to describe a bin in general, with the components of a narrow bucket 50 used by way of example, at the first end-wall 26a. One of ordinary skill in the art can extend this description to the attachment between the narrow bucket 50 and the bin divider 28, or to the attachment of the narrow bucket 60 to the bin housing 24. As shown in FIG. 6, each latch mechanism 90 comprises a first portion 92 secured to the bucket 50, and a second portion 94 secured to the bin end-wall 26a. In one embodiment, when the bucket 50 is closed, the latch mechanism 96 will automatically engage, securing the first portion 92 to the second portion 94, temporarily securing the bucket in the closed position until the latch mechanism 96 is released. In one embodiment, the bucket will open when the latch release handle 90 is actuated. In another embodiment the latch mechanism may be selectively locked by a locking mechanism upon closing or by the crew and must be unlocked before being manipulated by a passenger. In yet another embodiment opening and/or closing of the bins is completely controlled by the crew from a remote position such as the galley, or cockpit.

In one form, the latch 96 is configured to be remotely controlled. In one example, the crew may have a locking system whereby all latches 96 in an aircraft, or section of an aircraft, may be locked so that actuation of the latch release handle 90 will have no effect upon the latch 96. This system may be desired in case during take-off, landing, turbulence, emergency, or just for general safety. In another example, the crew may have access to a system for releasing all latches in the aircraft, or in a section of the aircraft, whereupon the buckets will open (pivot). This feature may be used for example when the cabin is empty of passengers, and it is desired to have all buckets open to facilitate passenger loading.

Looking to FIG. 6, in addition to the pivot 58 and latch 96, the bucket 50 may be connected to the bin housing 24 by way of a bin assist system which may incorporate elastic members such as springs, hydraulic members, and/or other mechanical/electronic devices to aid in opening/closing the bucket 50. This component is similar to components disclosed in U.S. Pat. No. 7,090,314 incorporated herein by reference.

FIG. 2 shows an aircraft interior 84 prior to installation of the seating and other interior components. The sidewalls 86 are installed below the modules 20 and PSU panels 44. These sidewalls 86 surround the windows 88 and provide an aesthetically pleasing barrier between the interior of the aircraft and the frame and/or inner skin.

80"—33/47 Example

One specific example is disclosed, for an 80" asymmetric PBI module. For every 80" module, two pivot buckets are configured in a 33" by 47" longitudinally adjacent arrangement. This example may allow passengers to stow standard carry-on roller bags transversely on their sides with three bags in the narrow bucket, and up to five bags in the wide bucket. The pivot buckets may also feature an electronic opening/latching option, which allows the crew to open all overhead bins simultaneously in preparation for boarding, as well as lock them in the closed position during TTOL (Taxi, Take Off, and Landing), all at the touch of a button. In addition, a bin assist system may be incorporated to help passengers close heavy bins with minimal effort.

Often, when a cabin interior is upgraded, airlines may desire new furniture, seats, and In-flight Entertainment (IFE) to improve the cabin aesthetics. Airlines may also require assistance with getting a Supplemental Type Certificate (STC).

One embodiment of a Baseline Kit to be used in installing of the disclosed asymmetric PBI includes:
  Half-oval lowered ceilings with light fixtures
  Overhead stowage bin valances
  80" support modules
  Pivot bins and actuation hardware
  End fillers and end caps as needed
  Passenger service units
The Baseline Kit to be used in installing of the disclosed asymmetric PBI may also include:
  Electronic bin latching system
  Electronic bin assist system
  New drop down 9" monitors for the PSUs
  Sidewall panels with new window reveals
  Overwing exit door linings
  LED fixtures and mood lighting controls
The installation of the disclosed asymmetric PBI may allow for salvage and/or re-use of existing:
  Ceiling panels (reworked) and air outlet nozzles
  Ceiling and sidewall wash light systems
  Bin supports (where possible)
  PSU monitors, hinges, and latches
  OEM sidewalls and air outlet rails
  Overwing exit door linings
  Dado panels

| Current Baggage Restrictions for Major Airlines | | | |
|---|---|---|---|
| Airline | Maximum size | Maximum Linear Length | Weight |
| Air France | 22" × 14" × 9" | | 26.4 lbs |
| Air Tran | | 55" [length + width + height] | |
| Alaska Air/Horizon | 24" × 17" × 10" | | |
| American Airlines | | 45" [length + | 40 lbs |

-continued

Current Baggage Restrictions for Major Airlines

| Airline | Maximum size | Maximum Linear Length | Weight |
|---|---|---|---|
| America West | | 51" [length + width + height] | |
| British Airways | 22" × 16" × 8" | | 26 lbs |
| Continental Airlines | | 51" [length + width + height] | 40 lbs |
| Delta Airlines | 22" × 14" × 9" | 45" [length + width + height] | 40 lbs |
| JetBlue | varies by plane | | |
| Northwest | 22" × 14" × 9" | | |
| Southwest Airlines | 24" × 16" × 10" | | 40 lbs |
| United Airlines | 22" × 14" × 9" | | 40 lbs |
| US Airways | 24" × 16" × 10" | | 40 lbs |
| Virgin Atlantic | 22" × 14" × 9" | | 35 lbs |

The term locking mechanism used herein defines an apparatus which interoperates with a latching mechanism to selectively allow operation of the latch through a separate step from the step of manipulating the latching mechanism. Thus, when the lock is engaged, a first manipulation is required to actuate the lock, and a second manipulation is required to actuate the latch.

While the present invention is illustrated by description of several embodiments and while the illustrative embodiments are described in detail, it is not the intention of the applicants to restrict or in any way limit the scope of the appended claims to such detail. In particular, an 80" module is used as an example, but modules of other longitudinal dimensions may also be utilized as required. In addition, a 33"/47" bucket arrangement (41%/59%) is used as an example, although other asymmetric bucket arrangements are within the scope of the disclosure and claims. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A luggage storage system for commercial aircraft, the system comprising:
 a. a bin housing comprising:
  i. an aircraft frame attachment device,
  ii. a bin divider;
  iii. a first bin end-wall on one longitudinal of the bin housing substantially parallel to the bin divider defining a first luggage compartment,
  iv. a second end-wall on the longitudinally opposite end of the bin housing from the first bin end-wall substantially parallel to the bin divider defining a second luggage compartment, and
  v. wherein the distance between the first bin end-wall and the bin divider is substantially less than the distance between the second bin end-wall and the bin divider.

2. The luggage storage system as recited in claim 1 wherein:
 a. the longitudinal width of the first luggage compartment is between 35% to 45% of the width of the bin housing; and
 b. the longitudinal width of the second luggage compartment is between 55% to 65% of the width of the bin housing.

3. The luggage storage system as recited in claim 2 wherein:
 a. the longitudinal width of the first luggage compartment is substantially 41% of the width of the bin housing; and
 b. the longitudinal width of the second luggage compartment is substantially 69% of the width of the bin housing.

4. The luggage storage system as recited in claim 1 wherein:
 a. the first luggage compartment comprises a first luggage compartment face which longitudinally overlies the first bin end-wall and a portion of the bin divider less than half the longitudinal thickness of the bin divider; and
 b. the second luggage compartment comprises a second luggage compartment face which longitudinally overlies the first bin end-wall and a portion of the bin divider less than half the longitudinal thickness of the bin divider.

5. An aircraft interior retrofit comprising the steps of:
 a. removing an existing bin housing from the aircraft;
 b. providing a retrofit bin housing having substantially the same longitudinal dimension as the existing bin housing;
 c. the retrofit bin housing comprising:
  i. an aircraft frame attachment device;
  ii. a first bin end-wall on one longitudinal of the retrofit bin housing;
  iii. a second end-wall on the longitudinally opposite end of the retrofit bin housing from the first bin end-wall;
  iv. a bin divider substantially parallel to each end-wall; and
  v. wherein the distance between the first bin end-wall and the bin divider is substantially less than the distance between the second bin end-wall and the bin divider;
 d. defining a first luggage compartment extending from the first bin end-wall to the bin divider;
 e. providing a second luggage compartment extending from the second bin end-wall to the bin divider; and
 f. installing the retrofit bin housing in place of the existing bin housing.

* * * * *